United States Patent [19]
Schiff

[11] 3,960,032
[45] June 1, 1976

[54] MOTION TRANSMITTING REMOTE CONTROL ASSEMBLY

[75] Inventor: Charles M. Schiff, Mentor, Ohio

[73] Assignee: Teleflex Incorporated, North Wales, Pa.

[22] Filed: Mar. 10, 1975

[21] Appl. No.: 557,078

[52] U.S. Cl. .............................. 74/501 R; 251/294
[51] Int. Cl.² ......................................... F16C 1/10
[58] Field of Search .................... 74/501 R, 501 P; 251/294, 78, 83

[56] References Cited
UNITED STATES PATENTS
3,885,474  4/1975  Brooke .......................... 251/294 X Primary Examiner—Samuel Scott
Assistant Examiner—Frank H. McKenzie, Jr.
Attorney, Agent, or Firm—McGlynn and Milton

[57] ABSTRACT

A modulator valve control assembly which is attached to an automatic transmission in an automotive vehicle to operate the modulator valve of the transmission in response to movement of the throttle linkage. The modulator valve modulates the shift point at which the transmission changes from one mode to another. The assembly includes a rectangular housing in which a bell crank lever is rotatably supported with one arm engaging a plunger which, in turn, is slidably disposed in a connection means for engaging the modulator valve of an automatic transmission. The other arm of the bell crank is connected through a helically coiled spring to a flexible core element of a motion transmitting remote control assembly which includes a conduit or guide means for slidably supporting the core element. The other end of the core element is attached to a threaded rod which, in turn, may be attached to the throttle linkage. The housing includes a stop against which the bell crank lever may be positioned as the core element is placed in tension to place the helically coiled spring in compression. The core element may move the bell crank against the stop and place the helically coiled spring in compression and a spacer is disposed between the guide or conduit and some portion of the core element to retain the core element in tension so that the assembly is preloaded. The assembly is then placed in connection with a transmission whereby the modulator valve places a force upon the plunger of the modulator control assembly to move the bell crank away from the stop and thereafter the connection means is tightened to prevent relative motion between the modulator assembly and the transmission housing so that the assembly is preloaded.

17 Claims, 3 Drawing Figures

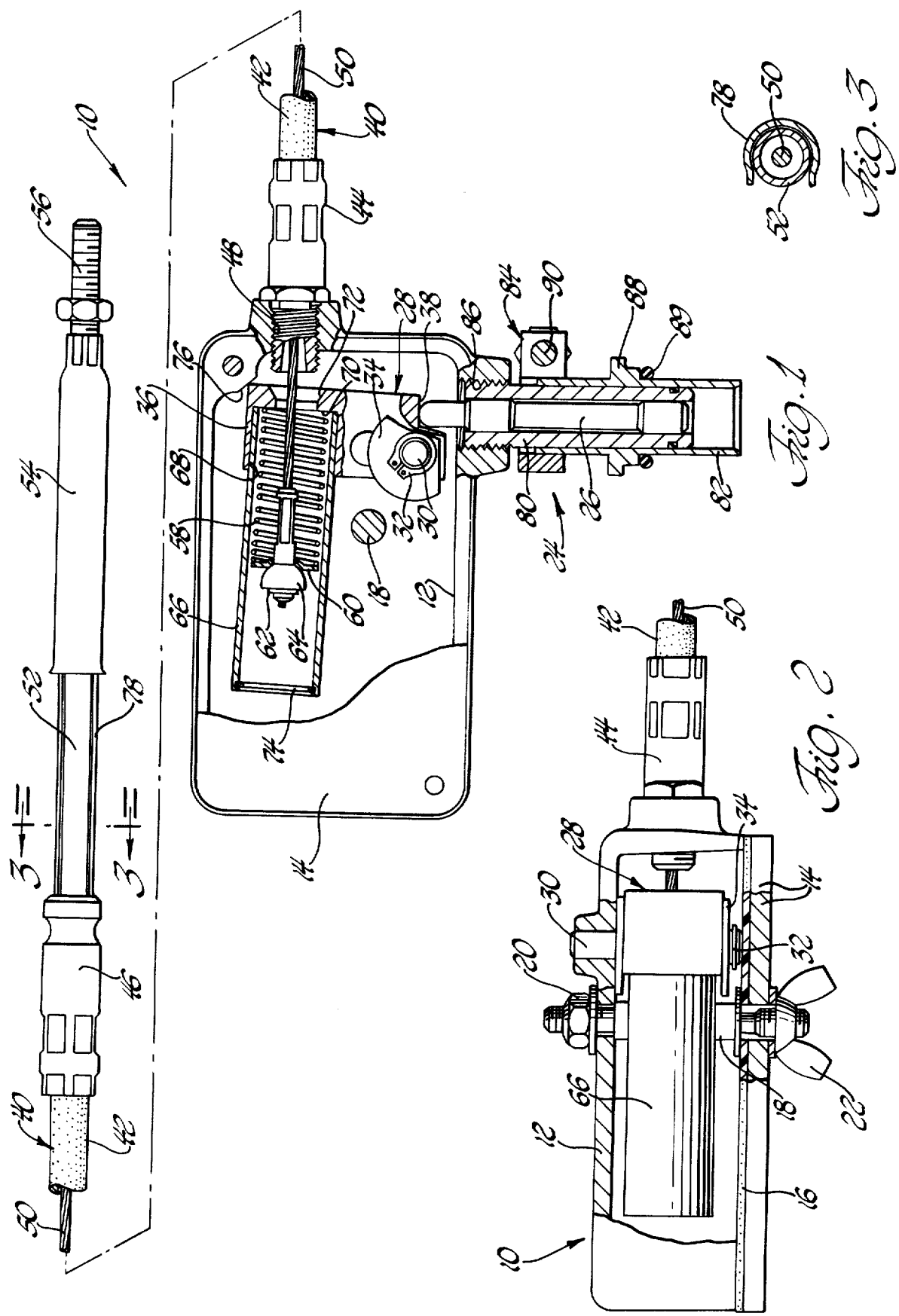

MOTION TRANSMITTING REMOTE CONTROL ASSEMBLY

The subject invention relates to a modulator valve control assembly utilized with an automatic transmission of the type included in automotive vehicles. More specifically, the invention relates to a modulator valve control assembly which receives an input to control or determine a shift point in the automatic transmission, the shift point being the point at which the transmission changes from one mode to another.

In a normal automatic transmission, the transmission automatically shifts in response to various inputs to the transmission. Normally, all shifts within the transmission are modulated according to the position of the throttle. This is accomplished through a modulator valve in the transmission which is moved in response to the position of the throttle. Mechanical motion transmitting remote control assemblies of the type including a flexible core element slidably supported within a conduit are frequently utilized to interconnect the modulator valve and the throttle linkage. An example of one such assembly is shown in U.S. Pat. No. 3,757,612 in the name of Robert H. Shaefer and assigned to the General Motors Corporation. In many situations it is not desirable that the modulator valve move during initial movement of the throttle linkage and should move only after a predetermined force is applied thereto by the motion transmitting remote control assembly. Thus, there is a need for a lost motion connection between the throttle linkage and the modulator valve and there is also a need to control the force applied to the modulator valve.

Modulator valve control assemblies of the type to which the instant invention pertains normally include an actuator means in the form of a plunger which engages a modulator valve in an automatic transmission when the modulator valve assembly is connected to the transmission housing. It is also desirable that the modulator valve control assembly be calibrated so that at a predetermined position a predetermined force is transmitted through the plunger to the modulator valve. This is now accomplished through trial and error during assembly.

This problem is solved by the subject invention as the modulator valve control assembly includes a novel motion transmitting assembly whereby when the modulator valve assembly is connected to the transmission housing, a predetermined force is applied to the modulator valve because the entire assembly is preloaded. To accomplish this, the subject invention includes a motion transmitting assembly including a guide means having first and second ends with a flexible motion transmitting core element slidably supported in the guide means and having its first and second ends extending from the respective ends of the guide means. A control means includes movable means, stop means for limiting the movement of the movable means and spring means operatively interconnecting the movable means and the first end of the core element whereby movement of the core element is transmitted through the spring means to the movable means. Also included is a spacer means for reacting between the core element and the guide means to position the core element relative to the guide means for moving the movable means against the stop means and applying a predetermined force to the spring means. Thus, when the modulator valve assembly incorporating the novel motion transmitting assembly is connected to the transmission housing, the movable means engages the modulator valve, and when the predetermined force is applied thereto the movable means moves slightly away from the stop means and the modulator valve control assembly is thereafter locked in position relative to the transmission housing.

Other advantages of the present invention will be readily appreciated as the same becomes better understood by reference to the following detailed description when considered in connection with the accompanying drawings wherein:

FIG. 1 is a side elevational view partially broken away and in cross section of a modulator valve control assembly incorporating the subject invention;

FIG. 2 is a top or plan view partially broken away and in cross section of the assembly shown in FIG. 1;

FIG. 3 is a cross-sectional view taken substantially along line 3—3 of FIG. 1.

A modulator valve control assembly constructed in accordance with the subject invention is generally shown at 10.

The assembly 10 includes a housing means defined by a casing 12 which includes a bottom wall and side walls and having a generally rectangular shape. The housing means also includes a cover 14 which covers the open side of the casing 12. A sealing gasket 16 is disposed between the cover 14 and the casing 12. The cover 14 is held in position by a stud 18 which extends through the bottom wall of the casing 12 and has a nut 20 threadedly secured thereto and extends through the cover 14 at the opposite end and has a wing nut 22 threadedly secured thereto.

Also included is a connection means, generally shown at 24, for connection to a receiving assembly, such as a transmission housing, and which, in turn, includes an actuated means such as a modulator valve stem which is engaged and moved by the assembly 10. A plunger 26 defines a modulator valve actuator means and is slidably supported by the connection means 24 so that when the assembly 10 is attached to a transmission housing, the plunger 26 engages the modulator valve for actuation thereof.

The assembly also includes a bell crank means generally indicated at 28 rotatably supported by the housing means for rotation about an axis for moving the plunger 26. More specifically, a stud shaft 30 extends from the casing 12 and rotatably supports the bell crank means 28 for rotation about the axis of the shaft 30. A snap ring 32 and a partial washer 34 retain the bell crank means 28 on the shaft 30 and allow removal thereof. The bell crank means 28 is a lever having its fulcrum at the apex of the angle formed by its two arms. In other words, the bell crank means 28 is a lever having its fulcrum at the axis of the shaft 30 which is at the apex of the angle formed between the arm 36, which extends upwardly, and the laterally extending arm 38, which engages the top of the plunger 26. Preferably, the arms 36 and 38 are at right angles relative to one another and the relationships between the sizes of the arms is such that they provide a three (3) to one (1) mechanical advantage from the input to the arm 36 to the output of the arm 38. In other words, a 5 pound force applied to the arm 36 produces a 15 pound output by arm 38.

The assembly 10 also includes a motion transmitting remote control assembly generally indicated at 40. The remote control assembly 40 includes a guide means comprising a flexible conduit 42 with end or support fittings 44 and 46 secured to the ends thereof. The conduit 42 may be any one of various well known types but is preferably of the type including metal filaments or load bearing elements embedded within a plastic tubular member. The fitting 44 is disposed at a first end of the guide means and the fitting 46 is disposed at the second end thereof. The fitting 44 threadedly engages the casing at 48 to connect the remote control assembly 40 to the housing means.

The remote control assembly 40 also includes a flexible motion transmitting core or cable element 50 movably supported within the guide means 40.

A guide tube 52 extends from the fitting 46 and surrounds the core element 50. An umbrella sleeve member 54 is swaged or otherwise connected to a threaded rod 56 which is, in turn, attached to the end of the core element 50. The sleeve member 54 is normally slidably disposed over the guide tube 52. The threaded rod 56 is adapted to be attached to a control member such as the throttle linkage in an automotive vehicle.

A spring means including a helically coiled spring 58 interconnects the first end of the core element 50 and the arm 36 of the bell crank means 28 whereby movement of the core element 50 is transmitted through the spring 58 to the bell crank means 28 for rotating the bell crank means 28 to move the actuator means or plunger 26. A connection means, comprising a washer 60, a lock ring 62 and a bullet member 64, interconnects the core element 50 and the outward end of the spring 58. The spring 58 reacts between the core element 50 and the first arm 36 of the bell crank means 28 and a tubular means 66 extends transversely from the first arm 36 and the coiled spring 58 is disposed within the tubular means 66. The first arm 36 includes a circular bore 68 therein and the tubular means 66 comprises a tube of circular cross section having one end disposed in the bore 68 and extending therefrom. The bore 68 has a bottom 70 with a truncated opening 72 extending therethrough. The core element 50 extends through the opening 72 and centrally through the spring 58. The spring 58 has its first end engaging the bottom of the bore 70 and its second or distal end disposed within the tube 66.

A locking means defined by a removable lock ring 74 is removably retained on the distal end of the tube 66 for retaining the spring 58 within the tube 66.

The casing 12 also defines a stop means or shoulder 76 for limiting rotational movement of the bell crank means 28 in the clockwise direction about the axis of the shaft 30 in response to a force supplied thereto by the core element 50.

When the assembly 10 is connected to an automatic transmission so that the plunger 26 engages a modulator valve in the transmission, it is desired that the plunger 26 apply a predetermined force to the modulator valve. This is accomplished by including a spacer means 78 reacting between the core element 50 and the guide means to position the core element 50 relative to the guide means for moving the movable means defined by the bell crank means 28 and plunger 26 against the stop means 76 to apply a predetermined force to the spring 58. The spacer means 78 retains the core element 50 in tension to place the spring 58 in compression when the spacer means 78 is in position reacting between the core element and the guide means. The sleeve 54 defines a projection at the second end of the core element and the spacer means 78 reacts between the end of the sleeve 54 and the fitting 46 of the guide means. The spacer means 78 is generally C-shaped in cross section, as best viewed in FIG. 3, and is substantially concentric with the axis of the core element 50 when in the reacting position. The spacer means 78 is disposed about the guide tube 52.

If it is desired that the modulator valve have a force of 15 pounds applied thereto when the assembly 10 is placed in position with the plunger 26 engaging the modulator valve, the length of the spacer means 78 is selected such that the spring 58 is placed in compression to move the arm 36 against the stop means 76 such that a force of approximately 15 pounds applied thereto by the plunger 26 is necessary to move the arm 36 from the stop means 76. Thus, when the assembly 10 is placed in position, the assembly is moved into position relative to the transmission assembly having the actuated modulator valve member to the extent that a force of 15 pounds is applied to the plunger 26 by the modulator valve to move the arm 36 away from the stop means 76. At that position the connection means 24 is tightened to maintain the relative positions between the modulator valve assembly 10 and the transmission assembly to which it is attached. Thereafter, the second end 56 of the core element is attached to the throttle linkage, preferably at an extreme travel of the throttle linkage and thereafter the spacer sleeve 78 is removed and no further calibration of the modulator control assembly should be necessary.

Frequently the connection between the modulator valve assembly 10 and the transmission housing provides sufficient variation in securing the two assemblies together that the position can be selected where the arm 36 moves away from the stop 76. However, the connection means 24 allows the control assembly 10 to be positioned relative to the transmission receiving assembly at a position where the force supplied to the movable bell crank means 28 by the actuated modulator valve means through the plunger 26 counterbalances the force supplied thereto by the core element 50 through the spring means 58. Such includes first and second telescoping members 80 and 82 and positioning means 84 for preventing relative movement between the telescoping members 80 and 82 at selected axial positions. The first telescoping member 80 is tubular and threadedly engages the casing 12 at 86. The first telescoping member 80 slidably supports the plunger 26. The second telescoping member 82 is slidably disposed on the first telescoping member 80 and is adapted by the flange 88 and appropriate snap rings for connection to the receiving assembly or housing of a transmission. The telescoping member 82 may be attached by a snap ring, or the like, to the transmission housing and thereafter the casing 12 is moved toward the transmission assembly to move the telescoping member 80 into the outer telescoping member 82 so that the plunger 26 bears against the modulator valve with a force required to move the arm 36 from the stop means 76. At this point, the position means 84 comprising a clamp is tightened to prevent relative sliding movement between the telescoping members 80 and 82. The clamp defining the positioning means 84 includes a fastener or tightening bolt 90 which may be tightened to clamp the outer telescoping member 82 to the inner telescoping member 80. The telescoping members 80 and 82 are circular in cross section with the second telescopic member 82 being disposed exteriorly about the inner telescoping member 80. An O-ring or gasket 89 is disposed about the telescoping member 82 to form a seal with the transmission housing.

The bell crank means 28 and the plunger 26 define movable means with the plunger 26 being a reaction member slidably disposed in the telescoping means 80. Also the bell crank means 28 defines a lever engageable with the plunger 26.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting assembly comprising: guide means having first and second ends; a flexible motion transmitting core element slidably supported in said guide means and having first and second ends extending from said ends of said guide means; control means including movable means, stop means for limiting the movement of said movable means, and spring means operatively interconnecting said movable means and said first end of said core element whereby movement of said core element is transmitted through said spring means to said movable means; and spacer means for reacting between said core element and said guide means to position said core element relative to said guide means for moving said movable means against said stop means and applying a predetermined force to said spring means.

2. An assembly as set forth in claim 1 wherein said control means includes connection means for connection to a receiving assembly having actuated means which is engaged and moved by said movable means and for allowing said control means to be positioned relative to the receiving assembly at a position where the force applied to said movable means by the actuated means counterbalances the force applied thereto by said core element through said spring means and moves said movable means to a position away from said stop means.

3. An assembly as set forth in claim 1 wherein said spacer means retains said core element in tension.

4. An assembly as set forth in claim 3 wherein said spacer means is placed in compression when in the reacting position between said core element and said guide means.

5. An assembly as set forth in claim 4 wherein said second end of said core element includes a projection and said spacer means reacts between said projection and the adjacent second end of said guide means.

6. An assembly as set forth in claim 5 wherein said spacer means is generally C-shaped in cross section and is substantially concentric with the axis of said core element when in said reacting position.

7. An assembly as set forth in claim 6 including a guide tube extending from said second end of said guide means for surrounding said core element, a sleeve member attached to said second end of said core element and slidably disposed over said guide tube, said guide means including a support fitting on said second end thereof, said spacer means being disposed about said guide tube with one end engaging said sleeve member and the other end engaging said fitting when in said reaction position.

8. An assembly as set forth in claim 7 wherein said guide means includes a flexible conduit with a second support fitting on said first end thereof for attachment to said control means.

9. An assembly as set forth in claim 2 wherein said connection means includes first and second telescoping members, and positioning means for preventing relative movement between said telescoping members at selected positions.

10. An assembly as set forth in claim 9 wherein said control means includes housing means for movably supporting said movable means, said first telescoping member being attached to and extending from said housing means, said second telescoping member being slidably disposed on said first telescoping member, and adapted for connection to the receiving assembly.

11. An assembly as set forth in claim 10 wherein said positioning means comprises a clamp for clamping said telescoping members together to selectively prevent relative sliding movement therebetween.

12. An assembly as set forth in claim 11 wherein said movable means includes a reaction member slidably disposed in said first telescoping member for engaging the actuated means.

13. An assembly as set forth in claim 12 wherein said telescoping members are circular in cross section with said second member being disposed about the exterior of said first member.

14. An assembly as set forth in claim 13 wherein said movable means includes a lever means rotatably supported by said housing means and engagable with said reaction member, said spring means comprising a helically coiled spring reacting between said lever means and said core element.

15. An assembly as set forth in claim 14 wherein said spacer means retains said core element in tension.

16. An assembly as set forth in claim 15 wherein said spring means is placed in compression when said spacer means when in the reacting position is between said core element and said guide means.

17. An assembly as set forth in claim 16 wherein said spacer means is placed in compression when in said reacting position.

* * * * *